Oct. 31, 1950 J. R. DAVEY 2,528,120

TELEGRAPH HUB REPEATER

Filed Sept. 9, 1948 2 Sheets-Sheet 1

INVENTOR
J. R. DAVEY
BY John E. Cassidy
ATTORNEY

Oct. 31, 1950 | J. R. DAVEY | 2,528,120

TELEGRAPH HUB REPEATER

Filed Sept. 9, 1948 | 2 Sheets-Sheet 2

INVENTOR
J. R. DAVEY
BY John E. Cassidy
ATTORNEY

Patented Oct. 31, 1950

2,528,120

UNITED STATES PATENT OFFICE 2,528,120

TELEGRAPH HUB REPEATER

James R. Davey, New York, N. Y., assignor to Bell Telephone Laboratories, Incorporated, New York, N. Y., a corporation of New York Application September 9, 1948, Serial No. 48,491

5 Claims. (Cl. 178—73)

Figure 1:
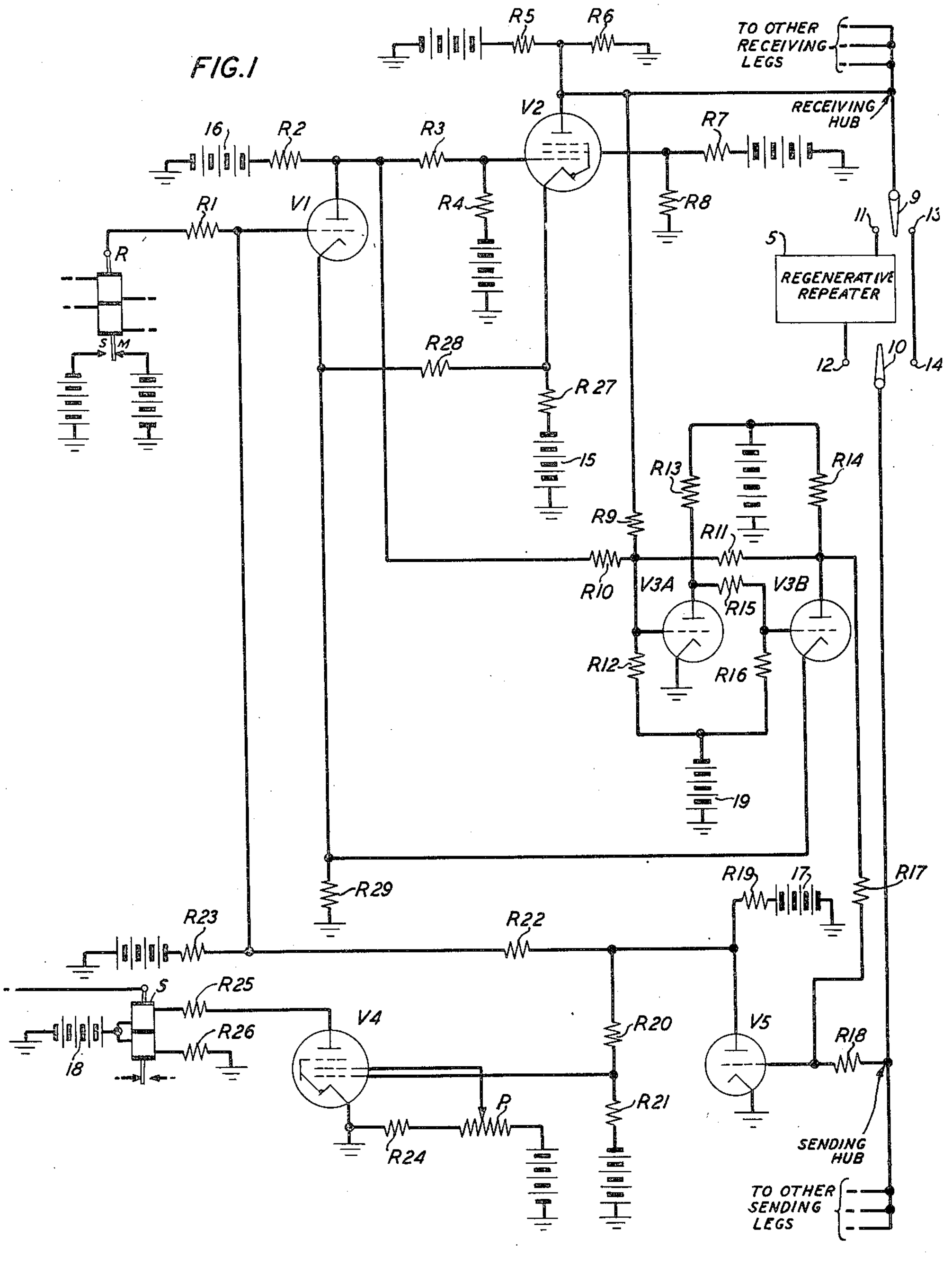

This invention pertains to hub type telegraph repeaters and more particularly to an improved hub type telegraph repeater of the electronic type. Hub telegraph repeaters are well known in the art. Such repeaters are described, for instance, in Patent 2,056,277, issued to F. S. Kinkead et al. October 3, 1936, and in Patent 2,069,224, issued to G. C. Cummings February 2, 1937. Hub repeaters arranged for multiway regeneration are described in Patents 2,337,496 and 2,392,339, issued to W. T. Rea on December 21, 1943, and on January 8, 1946, respectively. The hub type repeaters disclosed in such patents employ electromagnetic relays to perform the repeating and control function. The present repeater employs electronic devices to perform these functions and the improvement consists particularly in a break feature incorporated into an electronic hub type telegraph repeater.

There are a number of advantages obtainable from electronic devices as opposed to electromagnetic hub type repeaters. Among these are:

The electronic circuit requires no polar relay repeating device connected to the hub intermediate the receiving hub and sending hub when a regenerator is not employed as do electromagnetic hub circuits. Concentrations may, therefore, be built up by simply adding individual repeaters as required.

The maximum current which is required to flow through the contacts of the receiving relay in the individual electronic repeater is only a fraction of a milliampere whereas in electromagnetic repeaters a current of approximately 150 milliamperes may be reached. Breaking this current at the rapid signaling rate destroys contacts rapidly in electromagnetic circuits. This difficulty is obviously greatly reduced in an electronic circuit.

An object of the invention is the improvement of hub type telegraph repeaters of the electronic type.

A feature of the invention is a breaking arrangement in an improved electronic hub type repeater.

By a break feature is meant means whereby any one of the stations, say station A, associated through individual repeaters connected to the hub may signal a station, say station B, which is momentarily transmitting as an indication that station A wishes to transmit. Such an arrangement has heretofore not been available in an electronic hub type repeater per se.

The invention may be understood from the following description and reference to the associated drawings disclosing two preferred embodiments in which the invention is presently incorporated although it is pointed out that the invention is not limited to the embodiments disclosed herein and may be incorporated in other forms.

Figure 2:
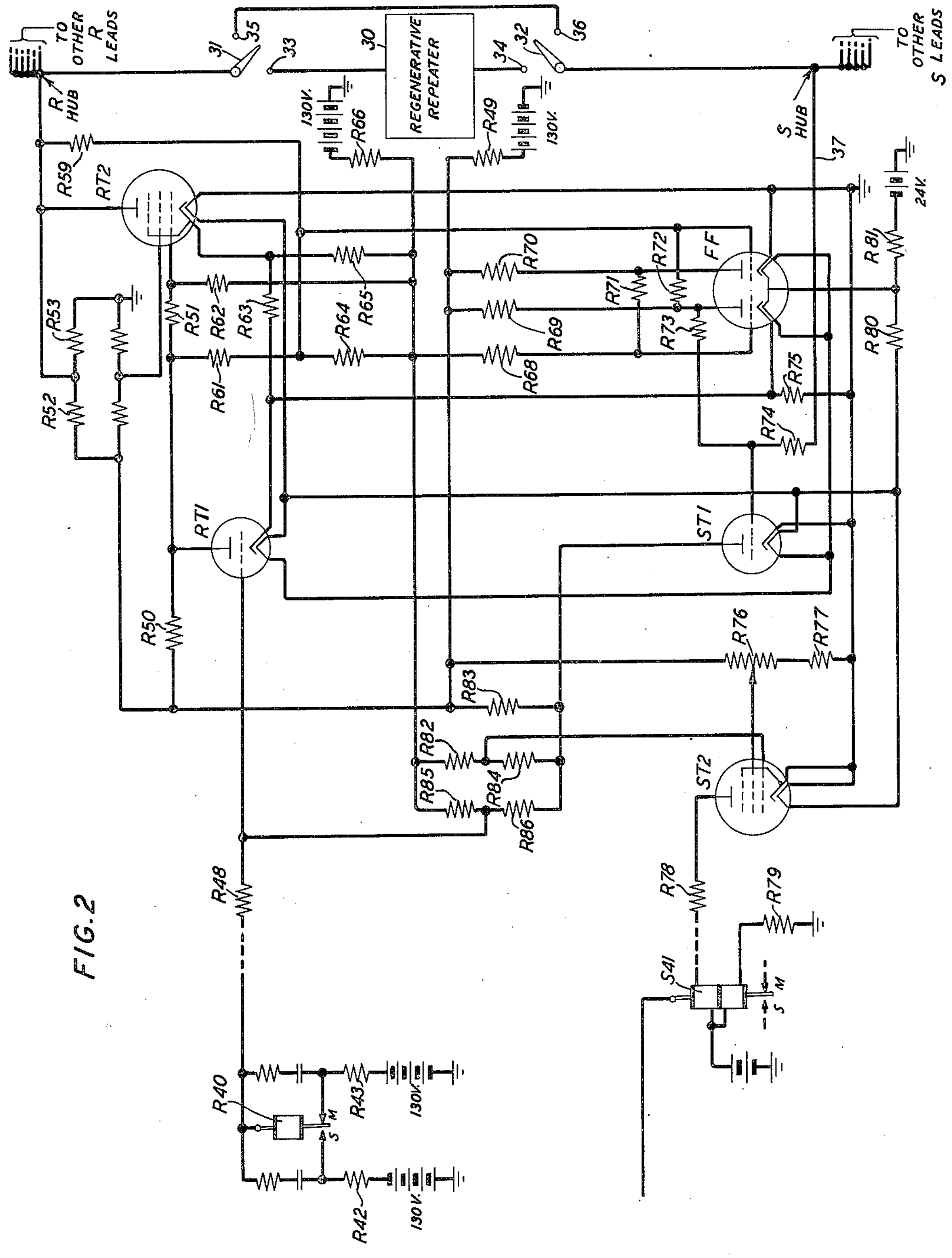

In the drawings:

Fig. 1 shows an improved electronic hub type repeater including a break feature; and Fig. 2 shows a second embodiment of the invention.

Refer now to Fig. 1 which shows an individual electronic hub type repeater connected to a hub circuit. Ordinarily, three or more individual repeaters will be interconnected through the hub. There is an individual receiving hub and an individual sending hub, vertical conductors shown at the right of Fig. 1. These may be interconnected directly or through a regenerative repeater, well known in the art, when regeneration is required. When a regenerative repeater 5 is required, switches 9 and 10 engage contacts 11 and 12, respectively, so that the regenerative repeater 5 is connected in series between the receiving hub and the sending hub. When a regenerative repeater is not required switches 9 and 10 engage contacts 13 and 14 respectively, so that the receiving hub and the sending hub are interconnected directly. The receiving legs of other individual repeaters are connected to the receiving hubs as indicated by the short horizontal spurs or straps in the upper right-hand corner of Fig. 1. The sending legs of other individual repeaters are connected to the sending hub as indicated by the short horizontal spurs or straps in the lower right-hand corner of Fig. 1. When the receiving hub and the sending hub are directly interconnected they constitute a single electrical conductor or an electrical point or hub.

Signals incoming to the individual repeater shown in Fig. 1 are impressed on receiving relay R shown in the upper left-hand portion of Fig. 1. The actuation of the armature of relay R changes the polarity of the potential applied to the grid of tube V1. For the idle or marking condition the armature of receiving relay R is in engagement with its right-hand or marking contact as shown. For this condition positive battery is impressed through resistance R1 between the grid and cathode of tube V1 causing the tube V1 to conduct.

The cathode potential of tube V1 is maintained at about −30 volts from the source of negative potential 15 through resistances R27 and R28. When tube V1 conducts, therefore, from positive battery 16 through resistance R2 the plate of tube V1 is at a potential near zero. When a spacing signal is impressed on receiving relay R a negative potential is impressed through resistance R1 on the grid of V1 and tube V1 is cut off with the result that the plate potential of tube V1 rises substantially to the potential of source 16, namely, positive 130 volts. The potential variations of the plate of tube V1 are coupled by means of potentiometer R3—R4 to the grid of tube V2. A mark causes a negative grid swing cutting off tube V2. The plate of tube V2 is connected to the receiving hub which is terminated by the potentiometer R5—R6 so that for the marking or idle condition the receiving hub is maintained at a positive potential which may be for instance +48 volts. A space causes a positive grid swing of tube V2 causing V2 to conduct and its plate potential and the hub potential to drop to a negative potential, which may be for instance —48 volts, toward the cathode potential of V2 of —60 volts, the cathode being connected through resistance R27 to negative source 15. A positive screen voltage provided by potentiometer R7—R8 aids in causing the plate-cathode potential of tube V2 to become very low.

The potential of the receiving hub for the marking and spacing conditions is impressed either through switch 9, contacts 13 and 14 and switch 10 directly on the sending hub or through switch 9, contact 11, regenerative repeater 5, contact 12 and switch 10 on the sending hub, and through resistance R18 on the grid of tube V5. When positive 48 volts is impressed on the grid of tube V5 the tube conducts from positive source 17 through resistance R19 and from the plate to the grounded cathode of tube V5. For this condition the plate of tube V5 drops to about positive 20 volts. For a spacing signal of —48 volts impressed on the grid of tube V5, tube V5 cuts off and the potential of its plate rises to substantially the voltage of source 17 which is positive 130 volts. These plate swings of tube V5 are coupled to the grid of tube V4 through potentiometer R20—R21. A mark causes a negative swing of the grid of tube V4 and tube V4 cuts off. As a result of this no current flows in the plate circuit of tube V4 from positive source 18 through the top winding of sending relay S and resistance R25 for the marking condition. For this condition the armature of sending relay S is maintained in engagement with its marking contact, as shown, by the effect of current flowing from positive source 18 through the bottom or biasing winding of source 18 and through resistance R26 to ground.

For the spacing condition the grid of tube V4 swings positive making the tube conducting. In response to current flowing in the plate circuit of tube V4 the armature of sending relay S is actuated to engage with its alternate or spacing contact. The screen potential of tube V4 is adjusted so that the current through the upper or operating winding of sending relay S is twice that of its biasing current, the number of turns in both windings are the same so sending relay S operates without bias.

It is necessary to prevent the retransmission from sending relay S of signals transmitted toward the hub from the receiving relay R in the same individual repeater. This is performed by the two triodes V3A and V3B and their associated connections. Although tubes V3A and V3B are shown as individual triodes it is pointed out that they may take the form of a twin triode if preferred. It is also pointed out that the same is true for tubes V1 and V5 which may be combined as a twin triode if desired.

Triodes V3A and V3B are arranged as a multivibrator or a flip-flop circuit, as it is known in the art, so as to maintain a hold or release condition once initiated. The input to the flip-flop circuit is the input circuit of triode V3A. The grid is supplied from three points of varying potential. First through resistance R10 from the plate of tube V1 which has a potential swing out of phase with the input from receiving relay R; second, through resistance R9 from the receiving hub which has a potential swing in phase with the receiving relay R; third, from the plate of the companion triode V3B in the flip-flop circuit through resistance R11 which plate has a swing in phase with the input to the grid of tube V3A thus acting as a holding potential and establishing the flip-flop action. The effect of the swing of the plate of tube V1 on the grid of tube V3A is made twice as great as the effect of the swing of the receiving hub. The effect of the swing of the holding potential from the plate of tube V3B is made equal to the effect of the swing of the receiving hub. The value of resistance R12 connected between negative source of potential 19 and the grid of tube V3A is such as to properly orient the voltage swings about the grid characteristic of tube V3A.

The marking potentials of the plate of tube V1 and of the receiving hub are thus arranged to tend to produce a zero voltage condition at the grid of tube V3A. In this marking condition the flip-flop circuit is controlled by its own holding potential from the plate of tube V3B and the voltage of the grid of tube V3A may be either positive or negative depending upon the previous grid swings caused by spacing conditions.

When a space originates from the home receiving relay R in the same repeater as that with which the particular flip-flop circuit under consideration is associated, a positive swing is applied through resistance R10 to the grid of tube V3A and a negative swing is applied from the receiving hub through resistance R9 on the same grid. Since the positive swing is twice the negative swing the net result is a positive swing at the grid of V3A. This swing will be twice the value of the holding potential so the grid of V3A will become positive whether the holding potential at the time is negative or positive. This makes tube V3A conducting and causes a fall in potential of its plate circuit which is applied to the grid of tube V3B cutting off tube V3B. This in turn causes the plate potential of tube V3B to rise to a high positive potential which results in a positive hold being applied through resistance R11 to the grid of tube V3A. This aids in swinging the grid of V3A positive and is effective to maintain the grid of V3A positive when receiving relay R returns to marking and the plate of tube V1 becomes less positive as a result of the tube's conduction.

The positive potential of the plate of tube V3B is also applied through resistance R17 to the grid of tube V5. Resistances R17 and R18 are so proportioned that the positive swing of the plate of tube V3B will cancel the negative swing of a space on the sending hub. This prevents tube V5 from cutting off in response to a spacing signal from the hub when it originates in the receiving relay R of the same individual repeater. The grid of tube V4 is, therefore, maintained at such a potential that tube V4 does not conduct and sending relay S is, therefore, maintained marking for this condition.

Although it is necessary to prevent the retransmission of a spacing signal from the sending relay S associated with a receiving relay R in the same individual repeater which is at the moment receiving signals and transmitting toward the hub, the sending relay S in each individual repeater must follow the signals incoming to the receiving hub from the receiving relays in other individual repeaters. This is effected as follows:

When a space is applied to the receiving hub from the receiving leg of some other repeater, the receiving hub goes negative and a negative swing is impressed through resistance R9 without an opposing large positive swing through resistance R10 since receiving relay R in the same individual repeater remains on its marking contact. The negative swing on the grid of tube V3A is of the same amplitude as the net positive swing occurring when a space is sent from the home receiving relay R. The grid of tube V3A thus becomes negative, overcoming the positive hold potential, if present. This causes the output of the flip-flop to change so that the plate of tube V3B changes to near zero potential, its cathode being at —30 volts. This provides a negative holding potential to aid in swinging the grid of tube V3A negative and holds it negative after the receiving hub goes to marking. The near zero potential of the plate of tube V3B keeps the signal swings of the sending hub applied through resistance R18 to the grid of tube V5 properly oriented on the grid characteristic so that spaces are transmitted outward to the sending relay S.

From the foregoing it should be apparent that signals arising in a particular individual repeater connected into the hub are prevented from being retransmitted from the sending relay of the same individual repeater whereas the sending relays of all other individual repeaters transmit signals impressed on the hub circuit.

*Break feature*

One of the requirements for the type of telegraph networks under consideration is that it be possible to "break" against transmission. That is, it should be possible to send a continuous spacing signal, from any station such as station A, to any other subscriber station, such as station B, which is at the time transmitting, in order to stop transmission from station B. Unless a break feature is provided, if, for instance, a spacing signal incoming from any station, such as station A, is present at a particular instant on the hub and simultaneously another spacing signal incoming from any other station, such as station B, is impressed on the hub, with the system arranged as described in the foregoing and with no further provision, the sending relay in the individual repeater connected to station A and the sending relay in the individual repeater connected to station B will both be in the marking condition through the effect of their individual flip-flop circuits on their sending legs in the manner explained in the foregoing for the individual repeater shown in Fig. 1.

Further, still assuming that no break feature is provided, if a continuous space exists on the hub from any one individual repeater, say repeater A, as would be the case, for instance, if station A were attempting to transmit a break signal, incoming transmission from any other individual repeater, say repeater B, would be transmitted back through the S relay in individual repeater B with the marking and spacing signals transposed. That is to say, a spacing signal element received by relay R in repeater B would effect a marking condition of the S relay in the same repeater for reasons explained. However, when relay R in repeater B returned to the marking condition which is the same as for the idle condition, the hold imposed by the flip-flop circuit in repeater B would be instantly removed so that the sending leg in repeater B would be in condition to transmit signals received from the hub. Since a continuous spacing condition is assumed to be impressed on the hub from another repeater, a spacing signal would be transmitted by the S relay in repeater B during each interval while the R relay in repeater B engaged its marking contact. The result is the transmission of transposed marking and spacing signal elements back through any individual repeater which transmits toward the hub while a continuous spacing signal is being impressed on the hub from some other individual repeater. The effect of this would be to delay the establishment of a break and in some cases make it impossible.

The circuit per Fig. 1 includes a break feature which operates in the following manner:

Whenever a spacing signal exists on the hub and is allowed to pass through the sending legs of all individual repeaters, other than the one in which the spacing signal originated, upon being applied to the grid of tube V5 in all such individual repeaters, such tubes in such repeaters are cut off causing a positive swing of their respective plates. This positive swing is applied through each corresponding resistance R22 to the grids of the corresponding tubes V1. The effect of this positive swing at the grid of tube V1 is made equal to the effect of the negative swing at the grid of V1 when the corresponding relays R are in the spacing condition. As a result of this it is impossible to transmit a spacing signal from any R relay in any individual repeater towards the receiving hub during any interval while a space is being transmitted through the sending hub by any other individual repeater. This has the result that the first space to pass through the hub circuit blocks the arrival of a second space and, more importantly, prevents the first space from being blocked by operation of the flip-flop circuit. In breaking against transmission, a continuous space, once it is the only space attempting to pass through the hub point, is allowed to pass through and is thereafter protected against interruption by incoming transmission. A continuous space is thus allowed to be transmitted through the sending leg of each individual repeater, other than the individual repeater in which it originated, to the connected subscriber loop in each instance and to stop any transmission incoming through the individual receiving leg associated with each of the other repeaters without effecting the transposition of marking and spacing signals in a particular individual repeater which attempts to transmit against a continuous spacing signal existing on the hub from another individual repeater attempting to break.

Refer now to Fig. 2 which shows a second embodiment of the invention. In Fig. 2 as in Fig. 1, one individual repeater is shown connected to the hub. Three or more individual repeaters identical with that shown in Fig. 1 will ordinarily be interconnected through the hub. Each strap connected in the upper right-hand corner of Fig. 2 to the receiving hub represents a connection to the receiving leg of one of these other individual repeaters. Similarly, each strap connected in the lower right-hand corner to the sending hub represents a connection to the sending leg of one of the other individual repeaters.

As in the case of Fig. 1, the receiving hub and the sending hub may be interconnected directly or through a regenerative repeater 30 as required by actuating switches 31 and 32. When switches 31 and 32 engage contacts 33 and 34, respectively, the regenerative repeater 30 is in circuit. When switches 31 and 32 engage contacts 35 and 36 respectively the regenerator is cut out and the receiving and sending hubs are interconnected so that they are electrically a single conductor or a single electrical point or hub.

Signals incoming to any individual repeater from its associated line or subscriber loop actuates the receiving relay in the receiving leg of the individual repeater such as receiving relay R40. When the system is idle and when it is in the marking condition relay R40, and the corresponding relay in each of the other individual repeaters, are all in engagement with their right-hand or marking contacts. For this condition in the single individual repeater illustrated, positive battery is impressed through resistance R43, marking contact and armature of relay R40 and resistance R48 on the grid of receiving triode RT1 which for this condition is conducting. The resulting lowered plate potential of tube RT1 is coupled to the grid of tube RT2 by potentiometer R51—R62 causing tube RT2 to be in a non-conducting condition. The plate supply for receiving tube RT2 is from positive battery through resistances 49, to the potentiometer formed by resistances 52 and 53 which latter is grounded, the plate and the receiving hub being connected to the junction between resistances 52 and 53. When receiving tube RT2 is cut off and the corresponding tube in the receiving leg of each of the other individual repeaters is similarly cut off the potential applied to the hub is positive, for instance positive 48 volts.

The positive potential of the receiving hub and the relatively negative potential of the plate of receiving tube RT1 are applied through resistances R59 and R61 respectively to the grid of the right-hand triode of the double triode tube FF which is connected as a flip-flop circuit. The potential at this grid then resulting from the connection of the plates of tubes RT1 and RT2 is such as not to influence the action of the flip-flop circuit, so that either the right-hand or the left-hand triode of flip-flop tube FF may be conducting depending upon whether the last preceding spacing signal was received from the receiving relay in the home individual repeater, that is to say, in the same individual repeater with the particular flip-flop circuit, or whether the last preceding spacing signal was impressed on the grid of the right-hand triode of flip-flop tube FF through the hub from a receiving relay such as relay R40 in the receiving leg of some other individual repeater.

The positive potential impressed on the receiving hub as a result of the reception of a marking signal element is applied either directly through switch 31, contact 35, contact 36 and switch 32 on the sending hub, or, if the regenerative repeater 30 is employed, through switch 31, contact 33, through the regenerative repeater 30, contact 34 and switch 32 on the sending hub. From the sending hub the positive potential is impressed through branch 37, and through corresponding branches, indicated by the spurs connected to the sending hub at the lower right, through a resistance, such as resistance R74 in the sending leg of each individual repeater, on the grid of a sending tube corresponding to sending triode tube ST1 in each individual repeater, making each such sending tube conducting. This in turn lowers the potential of the plate of each sending tube, such as triode ST1, the plate being supplied from positive battery through resistances, such as resistances R49 and R83. The lowered potential is impressed through a potentiometer formed of resistances such as resistances R82 and R84, on the grid of a pentode sending tube, such as sending tube ST2. No current therefore flows in the plate circuit of the sending tube such as sending tube ST2 in each individual repeater. The plate circuit of each such tube extends from positive battery through the top winding of a sending relay, such as sending relay S41, in the sending leg of each individual repeater. The armature of the sending relay such as S41 in each individual repeater is on its marking contact, such as contact M, as shown under the influence of current flowing from positive battery through its bottom winding and a resistance, such as resistance R79 to ground.

If relay R in any individual repeater is actuated to its spacing contact S, negative battery through a resistance, such as resistance R42 is impressed through the resistance corresponding to R48 on the grid of the receiving triode tube RT1, cutting off the tube which in turn activates the second receiving tube, corresponding to pentode RT2. This in turn reduces the potential of its plate and of the receiving hub to which it is directly connected. The receiving hub is thus made negative, for instance, —48 volts. The positive potential at the plate of the receiving tube RT1, impressed through resistance R61 on the grid of the right-hand triode of the double triode flip-flop tube FF makes the grid positive regardless of the fact that the plate of receiving pentode tube RT2 has gone toward negative. The right-hand triode of double triode FF is activated, lowering the potential of its plate. The plate circuit of the right-hand triode may be traced from positive battery through resistances R49 and R70 and the plate is connected through resistance R71 to the grid of the left-hand triode of flip-flop tube FF. When the right-hand anode of tube FF conducts, the lowered potential of its plate applied through resistance R71 to the grid of the left-hand triode of tube FF cuts off the left-hand triode. The flip-flop tube FF will remain in this condition with its right-hand triode conducting and its left-hand triode cut off even after relay R40 in its own individual repeater returns to marking.

The negative potential impressed on the hub as described above causes the grid of the triode corresponding to ST1 in each individual repeater, other than that in which the spacing signal originated, to go negative, cutting off each of these tubes which in turn swings its respective plate more positive, activates its corresponding sending tube ST2 and, as a result of the effect of the current flowing through the top winding of the corresponding sending relay S41, which is dominant over the countereffect of the biasing current, actuating each such relay to spacing.

It is important that a spacing signal incoming through a particular individual repeater when its receiving relay R40 is operated to its spacing contact should not be repeated back over the same line to the station in which it originated.

To prevent this, the sending relay S41 must be prevented from operation to spacing. This is effected through the flip-flop circuit in the same individual repeater, for as explained above the left-hand triode of that flip-flop circuit is cut off. This raises its plate potential making the grid of sending tube ST1 which is connected to the plate of the left-hand triode through resistance R73, more positive and therefore conducting, in turn cutting off sending tube ST2 which prevents the flow of current through the top winding of sending relay S41 and therefore maintaining relay S41 on its marking contact.

An incoming spacing signal from any other individual repeater through its receiving leg causes the receiving hub potential to become negative, or −48 volts. This causes the grid of the right-hand triode of the flip-flop tube FF in every individual repeater, other than that in which the spacing signal is originating, to become negative, cutting off the plate current, rendering the grid of its associated left-hand triode more positive, in turn activating the left-hand triode and the flip-flop circuit remains in this condition even after this spacing signal on the receiving hub is replaced by a marking signal. The associated sending tube ST1 in each such repeater is therefore not maintained activated under the control of the left-hand triode of the flip-flop circuit but is free to follow signals impressed on the hub and in turn to control its associated sending relay S41 in a manner which should be understood from the foregoing.

The grid of receiving tube RT1 is connected to the junction between resistances R85 and R86 in the plate circuit of sending tube ST1. The positive potential on the plate of tube ST1, whenever tube ST1 is non-conducting, drives the grid of receiving tube RT1 sufficiently positive so that tube RT1 cannot be driven negative by a subsequent operation of the receiving relay such as R40 in the same individual repeater. Hence as long as a spacing condition exists at the plate of sending tube ST1, a spacing signal from receiving relay R40 in the same individual repeater is prevented from interfering with it. Thus the break feature is accomplished.

What is claimed is:

1. In a telegraph system, an electronic hub type repeater, said repeater comprising a receiving leg having a magnetic receiving relay and a first and a second space discharge device connected therein in sequence to the hub of said repeater, said first device responsive to said relay, said second device responsive to said first device, a break feature in said repeater, a sending leg in said repeater, said break feature comprising a connection from said sending leg to the input circuit of said first device.

2. In a telegraph system, a plurality of individual electronic hub type repeaters interconnected together through a common hub, a receiving leg in each of said repeaters, a space discharge device in each of said legs, a sending leg in each of said repeaters and a break feature in each of said individual repeaters for breaking transmission from any of the other of said repeaters, said feature comprising a connection from said sending leg to the input of said device in each of said repeaters.

3. In a telegraph system, an individual electronic hub type repeater, a hub, a receiving leg and a sending leg in said repeater connected to said hub, an individual space discharge device in each of said legs, and a circuit branch connecting an output circuit of said space discharge device in said sending leg to an input circuit of said space discharge device in said receiving leg, so as to control transmission through said receiving leg in response to transmission through said sending leg.

4. In a telegraph system, an individual electronic hub type repeater, a hub, a receiving leg and a sending leg in said repeater connected to said hub, an individual space discharge device in each of said legs, an electronic control circuit interconnecting said two legs and said hub, a pair of space discharge devices interconnected as a flip-flop circuit in said control circuit, a connection between the output of one of said pair of devices and the input of said space discharge device in said sending leg, and a break feature in said repeater, said break feature comprising a connection between the output of said space discharge device in said sending leg and the input of said space discharge device in said receiving leg.

5. In a telegraph system, a plurality of individual electronic hub type repeaters, a hub, an individual receiving leg and an individual sending leg in each of said repeaters all connected to said hub, a space discharge device in each of said legs, an individual electronic control circuit in each of said repeaters, each of said control circuits individually interconnecting the sending leg and the receiving leg in its respective repeater, an electronic flip-flop circuit in each of said control circuits, each of said flip-flop circuits having a first and a second space discharge device, an input comprising a grid and an output comprising a plate in each of said first and said second space discharge devices, first individual connections from the output of each of said space discharge devices in each of said receiving legs to the grid of each of said first devices, respectively, second individual connections from said hub to the grid of each of said first devices, respectively, third individual connections from the plate of each said second devices to the grid of said device in each of said sending legs, respectively, and fourth individual connections from the output of said device in each of said sending legs to the input of said device in each of said receiving legs, respectively.

JAMES R. DAVEY.

REFERENCES CITED

The following references are of record in the file of this patent:

UNITED STATES PATENTS

| Number | Name | Date |
|---|---|---|
| 2,334,551 | Hanley | Nov. 16, 1943 |
| 2,337,886 | Hanley | Dec. 28, 1943 |
| 2,347,813 | Cummings | May 2, 1944 |